Patented Dec. 8, 1936

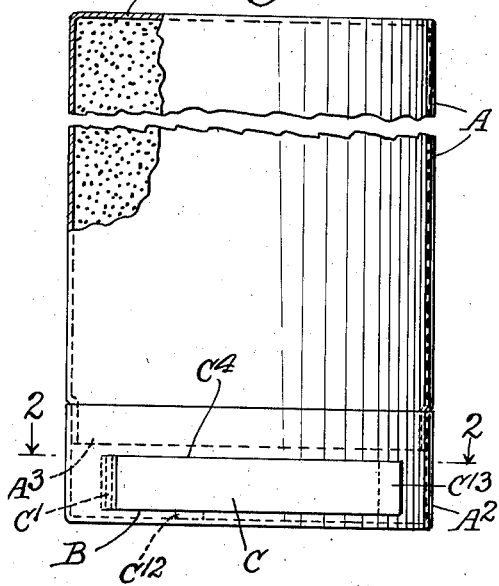
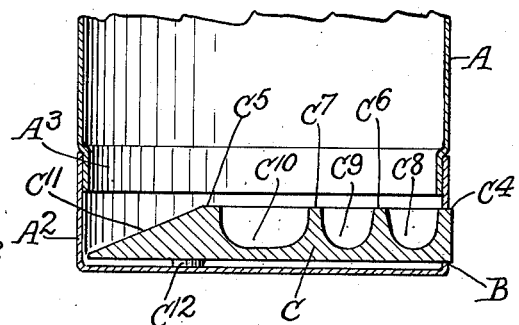
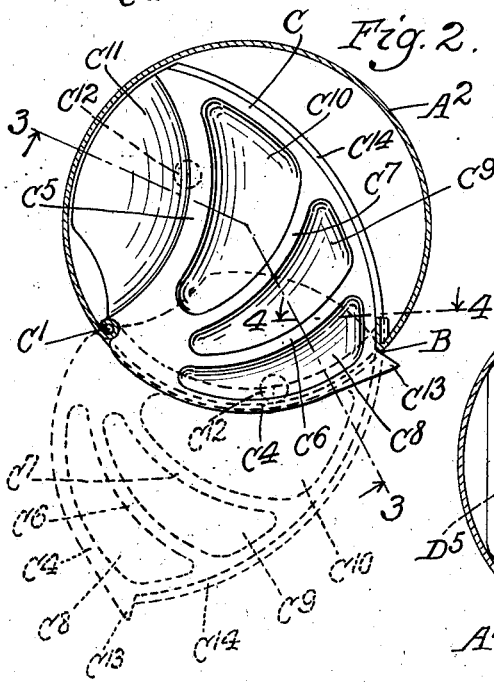
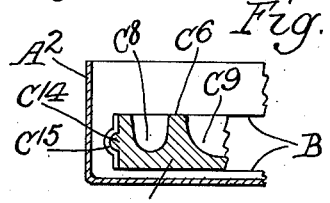
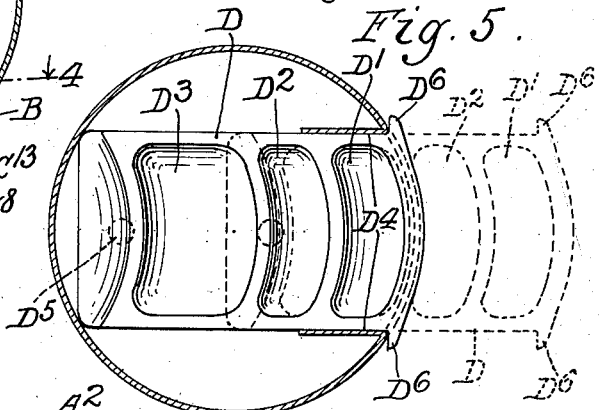

2,063,605

UNITED STATES PATENT OFFICE 2,063,605

MEASURING DEVICE

Peter A. Janssens, Chicago, Ill.

Application August 9, 1934, Serial No. 739,064

3 Claims. (Cl. 221—105)

My invention relates to a dispensing container or measuring device. One purpose is the provision of means for delivering a measured quantity of material from a container. Another purpose is the provision of means for selectively delivering different but precisely measured quantities from a container. Another object is the provision of means for measuring and removing from a container a predetermined charge of material, without permitting the escape of additional material from a container. Another object is the provision of a measuring device which can be associated integrally with a container, or which, if preferred, can be removably applied to a container. For example, baking powder might be sold in a can provided with one of my dispensing devices. Or the dispensing device may be formed separately from and later added to the can, the purchaser applying it to the can after purchase of the can and replacing empty cans by full ones from time to time, as the contents become exhausted in use. Other objects will appear from time to time in the course of the specification and claims.

I illustrate my invention more or less diagrammatically in the accompanying drawing, wherein—

Figure 1 is a side elevation with parts in section;

Figure 2 is a section on the line 2—2 of Figure 1;

Figure 3 is a section on the line 3—3 of Figure 2;

Figure 4 is a detail section on the line 4—4 of Figure 2; and

Figure 5 is a section similar to Figure 2 of a modified form.

Like parts are indicated by like symbols throughout the specification and drawing.

Referring to the drawing, A indicates any suitable container, herein shown as cylindrical. It may be a container adapted and ready for sale in a store, for example a container of salt, sugar, baking powder, or the like. It may have any suitable end closure $A^1$. Formed in the cylindrical side and preferably adjacent the end opposite to the closure $A^1$ is an aperture B. In the drawing I illustrate this aperture as formed in a separate cylindrical member $A^2$, which may overlap with the end flange $A^3$ of the container A. It will be understood, however, that the original end cap or closure of the container A, not shown, has been removed. It will be realized, however, and it is thought that no additional showing in the drawing is needed, that the container A and the member $A^2$ may if desired be permanently secured to each other or be formed integrally. However, there is an advantage in forming them separately, because as the contents of each container A are exhausted, the empty container may be thrown away and a new container fitted in or secured to the member $A^2$.

Associated with the aperture B is a dispensing member generally indicated as C. In the form of Figure 1 it is indicated as pivoted, as at $C^1$, for rotation about an axis parallel to the axis or long extension of the container A. The pivoted container or dispensing member C is provided with a face $C^4$ adapted snugly to close the aperture B when the dispensing member is in closed position. It has another face $C^5$ adapted to close the aperture when the dispensing member is in full open or dispensing position. It has intermediate walls $C^6$ and $C^7$ which close the aperture B when the member C is in intermediate position. The above walls divide the dispensing portion of the member C into a plurality of separate measuring and dispensing parts indicated, for example in Figure 2, as $C^8$, $C^9$ and $C^{10}$. These may be of different volumetric capacities, for example, two may be of one-quarter teaspoon and the third of one-half teaspoon size. Therefore, depending upon how far the member C is withdrawn into dispensing position, a quarter teaspoon or a half teaspoon or a full teaspoon may be dispensed. The member C may be of any suitable material but I illustrate it as formed, for example, of fiber, Bakelite or the like. It will be understood, of course, that it may be of other material, such as metal. $C^{11}$ indicates a sloping inner projection of the inner closure wall to the member C. Preferably it more or less hugs the bottom of the container in such fashion that when the dispensing member is pushed back into closed position, it plows readily through the finely divided material being dispensed, and takes its proper closed position. While the bottom of the container is close to the bottom of the member $A^2$, still it is not desirable to have a grinding action take place upon the particles, for example when baking powder is dispensed. I may therefore provide, if necessary, small spacing members $C^{12}$ which slightly space the bottom of the dispensing member C from the bottom of the container. The member $C^{12}$ may have the additional function, if desired, of limiting the outward withdrawal of the dispensing member. I may provide any suitable outwardly extending handle member $C^{13}$, whereby the dispensing member may be drawn outwardly into dispensing position. The handle member may also be so formed as to limit the inward movement of the dispensing member. Or the dispensing member may be so formed as to make any stop unnecessary, as by contact with the inner face of the container when the parts are in the position in which they are shown in full line in Figure 2. In order to align or control the movement of the dispensing member I may also form it with a side flange $C^{14}$ on its arcuate side, this flange serving as a guide which penetrates a notch $C^{15}$ formed in the side of the aperture B. However, it will be understood that this is a feature which may under some circumstances be omitted.

Referring to the form of Figure 5 I illustrate substantially the same container but provide a dispensing member D, with a plurality of dispensing apertures of different volumetric capacities $D^1$, $D^2$, $D^3$. The member D is slidably mounted in the aperture $D^4$. This inward movement in relation to the aperture may be limited by contact with the opposite face of the can A or $A^2$. Its outward withdrawal may be limited in any suitable manner, as for example by the upset portion or flange $D^5$. Any suitable exterior handle $D^6$ may be provided for the withdrawal of the device. Except for the fact that it is slidably mounted instead of rotatably mounted the member D operates substantially as does the dispensing member C.

It will be realized that both forms may be readily employed in connection with the sale or dispensing of articles, preferably finely divided articles, which are employed in measured quantities. In employing, say, baking powder, the user may employ the dispensing member C or D to measure out any desired subdivision or multiple of a basic measure such as a teaspoonful. The dispensing is easy and the measuring easy and accurate.

It will be realized that whereas I have described and shown a practical and operative device, nevertheless many changes might be made in the size, shape, number and disposition of parts without departing from the spirit of my invention. I therefore wish my description and drawing to be taken as in a broad sense diagrammatic rather than as limiting me to my specific showing.

It will be particularly understood that the shape and size of the container and the purpose of the container and the substance dispensed by the container are a matter of choice and can be widely varied without departing from the spirit of my invention.

In the claims it will be understood that where I claim a container I wish the term to be interpreted broadly enough to cover the employment of a dispensing member separate from but applicable to a container, or to the application of my invention directly to the container itself.

My invention is also applicable to other uses than dispensing a loose material. For example, by a mere change in the size and shape of the container, for example, by making the member $A^2$ shorter and putting a cover on it, it becomes admirably adapted for use as a compact. The individual dispensing members may be made of varying sizes or of the same size and they may be filled with a variety of substances, for example, rouge, powder or the like, or powders of various tint where that is desired. It will be understood, therefore, that my invention has a wide applicability to a variety of uses.

I claim:

1. In a dispensing device, a container, a dispensing member movably associated therewith, and normally positioned within the container, said dispensing member being formed with a plurality of dispensing portions of predetermined volumetric capacities, said dispensing member including bounding portions defining said dispensing portions, the container being apertured in line with the movement of the dispensing member into and out of the interior of the container, said bounding portions being of the same cross sectional area as said aperture, said dispensing member being pivoted to the container for rotation about an axis generally parallel with the long axis of the container, said aperture being of a length substantially equal to the radius of the dispensing member, the opposite edges of said dispensing member being at all times in closing contact with the ends of said aperture.

2. In a dispensing device, a generally cylindrical container, a dispensing member movably associated with one end thereof, and lying in general parallelism with one end of said cylinder, and normally positioned within the container, said dispensing member being formed with a plurality of dispensing portions of predetermined volumetric capacities and bounding portions separating said dispensing portions, the side of the container, adjacent the end, being apertured in line with the movement of the dispensing member into and out of the interior of the container, opposite edges of said member engaging at all times the ends of said aperture, the bounding portions between the dispensing portions closing said aperture by engagement with the upper edge thereof, said dispensing member being pivoted to the container for rotation about an axis generally parallel with the axis of the cylinder, the aperture being of a length substantially equal to the radius of the dispensing member.

3. In a measuring dispensing device, a container, a dispensing member movably associated with a wall of said container, said member including a body portion movable into and out of said container in a single predetermined plane, said member being provided with a plurality of concave measuring apertures positioned therealong, and having walls surrounding each said aperture, the upper portions of said walls lying in a single plane parallel with the adjacent wall of said container, said member being supported by and movable over said adjacent wall.

PETER A. JANSSENS.